(12) United States Patent
Leclercq et al.

(10) Patent No.: US 8,856,523 B2
(45) Date of Patent: Oct. 7, 2014

(54) METHOD AND DEVICE FOR COMMUNICATION ON A COMMUNICATION LINK BETWEEN AN AIRCRAFT AND A GROUND STATION

(75) Inventors: Agnes Leclercq, Toulouse (FR); Cecile Colle-Morlec, Labarthe sur Leze (FR); Pascal Boucard, Colomiers (FR)

(73) Assignee: Airbus Operations SAS, Toulouse (FR)

( * ) Notice: Subject to any disclaimer, the term of this patent is extended or adjusted under 35 U.S.C. 154(b) by 1476 days.

(21) Appl. No.: 12/297,219

(22) PCT Filed: Apr. 5, 2007

(86) PCT No.: PCT/EP2007/003101
§ 371 (c)(1),
(2), (4) Date: Oct. 15, 2008

(87) PCT Pub. No.: WO2007/121844
PCT Pub. Date: Nov. 1, 2007

(65) Prior Publication Data
US 2009/0077626 A1    Mar. 19, 2009

(30) Foreign Application Priority Data
Apr. 18, 2006 (FR) ..................... 06 03378

(51) Int. Cl.
*G06F 21/00* (2013.01)
*H04B 7/185* (2006.01)

(52) U.S. Cl.
CPC .................. *H04B 7/18506* (2013.01)
USPC ............... 713/166; 713/1; 713/170; 713/182; 701/31.5; 701/32.6; 370/310; 370/239; 370/241

(58) Field of Classification Search
CPC .................................................. H04B 7/18506
USPC ............ 713/166, 170, 182, 1; 701/31.5, 32.6; 370/310, 239, 241
See application file for complete search history.

(56) References Cited

U.S. PATENT DOCUMENTS 6,353,779 B1    3/2002  Simon et al.
6,865,426 B1 *  3/2005  Schneck et al. ................... 700/9

(Continued)

FOREIGN PATENT DOCUMENTS

| | | |
|---|---|---|
| EP | 1 280 316 | 1/2003 |
| JP | 10-242956 A | 9/1998 |
| JP | 11-215036 | 8/1999 |
| JP | 2004-32664 A | 1/2004 |
| WO | 2004 047405 | 6/2004 |

OTHER PUBLICATIONS

Google Patent Search.*

(Continued)

*Primary Examiner* — Arvin Eskandarnia
(74) *Attorney, Agent, or Firm* — Oblon, Spivak, McClelland, Maier & Neustadt, L.L.P.

(57) ABSTRACT

A communication method on a communication link between an aircraft and a ground station, the communication capable of being configured according to a plurality of safety levels in which, when the aircraft sends a request to a ground station to modify the safety level of the communication from a previous safety level to a new safety level and the aircraft does not receive an acknowledgement of the request by the ground station, the aircraft still accepts messages from the ground station according to the new security level.

11 Claims, 1 Drawing Sheet

(56) References Cited

U.S. PATENT DOCUMENTS

| | | |
|---|---|---|
| 7,069,437 B2 * | 6/2006 | Williams .................... 713/166 |
| 7,660,986 B1 * | 2/2010 | Qiu et al. .................... 713/166 |
| 2003/0105979 A1 * | 6/2003 | Itoh et al. .................... 713/201 |
| 2003/0109973 A1 | 6/2003 | Hensey et al. |
| 2003/0139135 A1 | 7/2003 | Rossi |
| 2004/0153506 A1 * | 8/2004 | Ito et al. .................... 709/204 |
| 2005/0081032 A1 * | 4/2005 | Struik .................... 713/166 |
| 2005/0286452 A1 * | 12/2005 | Hardgrave et al. .......... 370/310 |
| 2008/0016340 A1 * | 1/2008 | Holden et al. .............. 713/164 |
| 2009/0178144 A1 * | 7/2009 | Redlich et al. .................. 726/27 |

OTHER PUBLICATIONS

U.S. Appl. No. 12/281,712, filed Sep. 4, 2008, Leclercq, et al.
U.S. Appl. No. 12/281,687, filed Sep. 4, 2008, Leclercq.
U.S. Appl. No. 12/294,311, filed Sep. 24, 2008, Leclercq, et al.
U.S. Appl. No. 12/301,319, filed Nov. 18, 2008, Leclercq, et al.
Office Action issued Aug. 28, 2012, in Japanese Patent Application No. 2009-505744 with English translation.

* cited by examiner

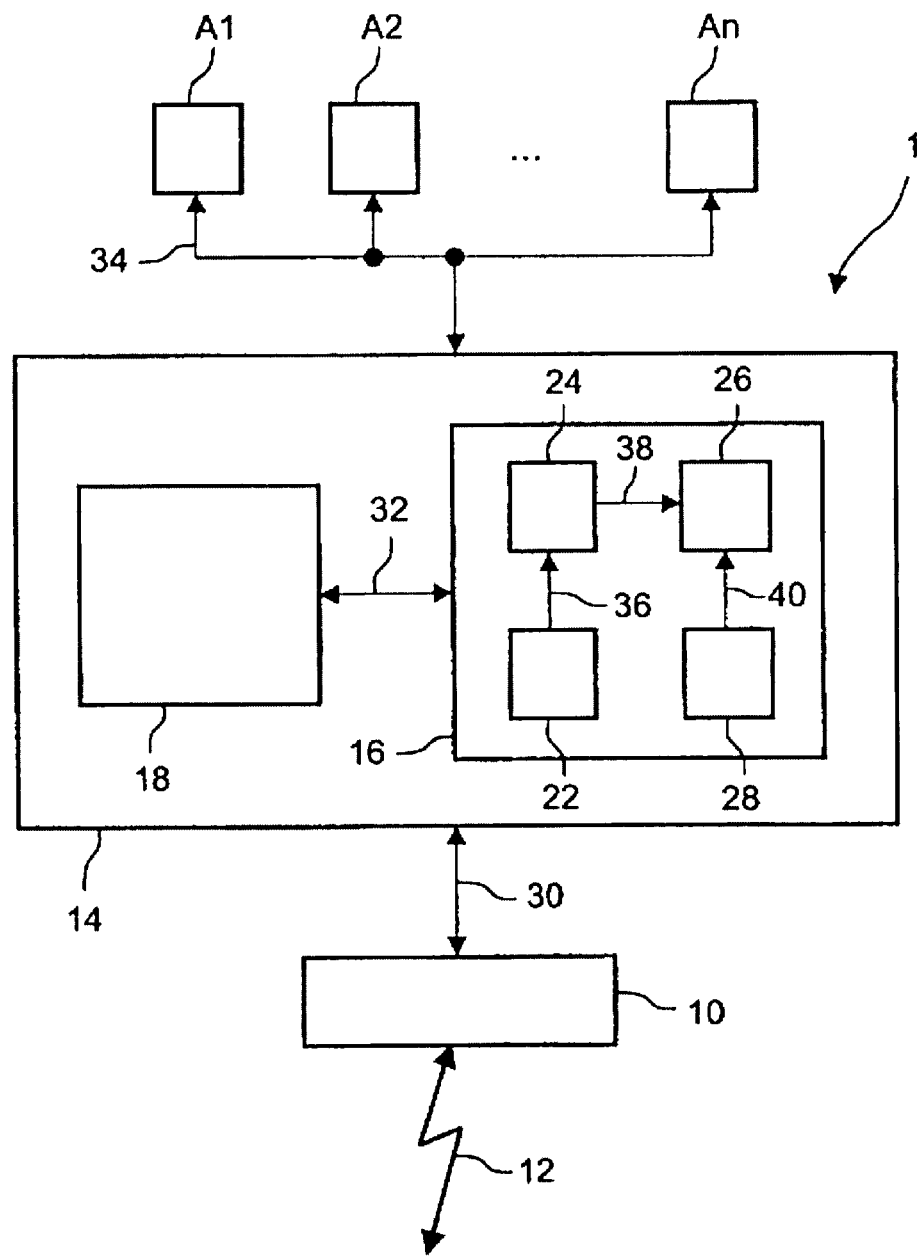

METHOD AND DEVICE FOR COMMUNICATION ON A COMMUNICATION LINK BETWEEN AN AIRCRAFT AND A GROUND STATION

The object of the invention is a method for communication on a secure communication link between an aircraft and a ground station, particularly during the change of a security level associated with this communication, as well as an aircraft provided with a device capable of implementing this method. The invention also relates to a device for communication on a secure communication link between an aircraft and a ground station, particularly during the change of a security level associated with this communication, as well as to an aircraft provided with such a device.

Modern aircraft, particularly civil transportation airplanes, exchange information items with ground-based stations, especially air traffic control stations or stations making it possible to communicate with the airline companies operating these aircraft. The information items exchanged may relate in particular to meteorology, to aircraft maintenance, to air traffic control authorizations, etc. This exchange of information items is generally achieved by means of digital data links ("datalink" in English), corresponding in particular to the standards ACARS ("Aircraft Communications Addressing and Reporting System" in English) or ATN ("Aeronautical Telecommunication Network" in English). These data links are generally of the radiocommunication or satellite type. In order to guarantee confidentiality of exchanged data and security of the communication with regard to the risk of intrusion by a pirate, these links may be made secure: thus it is possible, for example, to provide for authentication of the emitter of a message and/or encryption of the messages, the security level being chosen by the aircraft pilot. For example, this authentication and/or this encryption may be achieved by means of authentication and/or encryption keys. Sometimes it may be necessary to change the security level of the communication during the course of flight of an aircraft, particularly during flights over countries that prohibit encrypted communications. When the aircraft pilot asks for the change of security level of the communication, if a request for change of security level sent by the aircraft to the ground station is not acknowledged by the ground station, there is no longer coherence between the security level demanded by the aircraft (new level) and the security level considered to be active by the ground station (old level). The absence of acknowledgment of the said request by the ground station may be due in particular to loss of the request message sent by the airplane to the ground station or to loss of the message sent by the ground station to the airplane to acknowledge the request.

In the field of communications, a traditional method for unblocking a situation of incoherence between an emitter and a receiver consists in repeating the communication starting from an initial state known to both the emitter and the receiver. In the case of the communication link under consideration, that could consist in reinitializing the communication between the aircraft and the ground station on the basis of a non-secure communication and in opening a secure communication session having a security level corresponding to the desired security level. Nevertheless, such a method would suffer from several disadvantages. A first disadvantage is related to the fact that opening of a secure communication session necessitates the exchange of several messages between the aircraft and the ground station and consequently a non-negligible time for establishing the said session, which would risk being harmful as regards the needs of communication between the aircraft and the ground station, since the aircraft and the ground station are unable to exchange useful messages during this establishment time. Another disadvantage is related to the fact that the return to a non-secure initial communication state could be prejudicial to the security of the communication, particularly if messages were exchanged between the aircraft and the ground station between the moment at which the communication would be reinitialized according to this non-secure communication state and the moment of opening of the secure session.

According to the invention, these problems are solved at least partly by a method for communication on a communication link between an aircraft and a ground station, the said communication link being capable of being configured according to a plurality of security levels, which is noteworthy in that, when the aircraft sends a request to the ground station with a view to modifying the security level of the said communication from an old security level to a new security level and it does not receive any acknowledgment of the said request by the ground station, this aircraft nevertheless accepts the messages received from the ground station according to the said new security level.

In this way, if the ground station indeed has received and taken into account the request for change of level sent by the aircraft, but the acknowledgment message sent by the ground station has not been received by the aircraft, continuity of the communication with the desired security level is assured.

In a preferred embodiment, as long as the aircraft has not received any acknowledgment from the ground station relating to the change of security level: when the new security level corresponds to a security level lower than the old security level, the aircraft rejects the messages received from the ground station according to the old security level; when the new security level corresponds to a security level higher than the old security level, the aircraft continues to send messages to the ground station according to the old security level; when the new security level corresponds to a security level lower than the old security level, the aircraft sends messages to the ground station according to the new security level. This preferred embodiment of the invention makes it possible to respect the regulations of countries over which the aircraft is flying when the aircraft pilot asks for lowering of the security level of the communication in order to fly over a country that prohibits encryption of communications.

Advantageously, when the new security level corresponds to a security level higher than the old security level, the aircraft additionally accepts the messages received from the ground station according to the old security level, as long as it has not received any acknowledgment from the said ground station relating to the change of security level.

In a particular embodiment of the invention, the security level of the communication is a function of the type of message transmitted. That makes it possible to adapt this security level to the importance and to the criticality of the messages, in order to send with a high security level (often having a higher sending cost than for a lower security level) only messages for which that is of importance.

In another particular embodiment of the invention, when the aircraft receives from the ground station a message whose security level corresponds to the said new security level, it is additionally considered in the aircraft that the said request to change the security level of the communication has been acknowledged by the ground station. In effect, since the ground station has sent this message with the new security level, it is possible to consider that it indeed has taken into account the request for change of level sent by the aircraft: the sending by the ground station of the said message received by the aircraft therefore corresponds to implicit acknowledgment of the said request, thus making it possible to return to a coherence situation between the security level demanded by the aircraft (new level) and the security level considered to be active by the ground station.

The invention also relates to an aircraft capable of implementing a communication method such as cited in the foregoing on a communication link between this aircraft and a ground station.

The invention also relates to a device for communication on a communication link between an aircraft and a ground station, the said communication being capable of being configured according to a plurality of security levels, the device being provided with:
- means for emitting/receiving messages on this communication link;
- communication management means connected to the said emitting/receiving means;
- communication monitoring means comprising first means capable of analyzing a message received by the said emitting/receiving means in order to determine a security level corresponding to this message;

This device is noteworthy in that it is additionally provided with:
- means capable of storing in memory an old and a new security level when the aircraft sends to the ground station a request to change the security level of the communication;
- means capable of storing in memory a communication state corresponding to an acknowledgment or to an absence of acknowledgment, by the ground station, of a request to change the security level of the communication, sent by the aircraft to the said ground station;
- in the communication monitoring means:
  - second means capable of comparing the said security level corresponding to this received message with the said new security level stored in memory and of furnishing a comparison result;
  - third means capable of determining an action relating to acceptance of the said received message as a function on the one hand of the comparison result furnished by the second means and on the other hand of the value of the said communication state stored in memory.

Advantageously, the said communication management means comprise the said communication monitoring means.

Also advantageously, the communication management means additionally comprise means capable of managing the value of the said communication state associated with the said link.

The invention also relates to an aircraft provided with a device for communication between an aircraft and a ground station, as stated in the foregoing.

The invention will be better understood by reading the following description and by examining the attached FIGURE.

FIG. 1 is a block diagram of a device according to the invention for communication on a communication link between an aircraft and a ground station.

Device 1 according to the invention, represented schematically in FIG. 1, is installed on board an aircraft, particularly a civil transportation airplane, communicating with a ground station by means of a communication link 12, in particular a digital data link ("datalink" in English) capable of being configured according to a plurality of security levels relative to the risks of intrusion by a pirate on this link.

This device is intended to determine whether a message received by the aircraft on this link 12 must be accepted or refused, particularly during incoherence between the security level demanded by the aircraft and the security level considered to be active by the ground station. For that purpose, device 1 according to the invention is provided with:
- means 10 for emitting/receiving messages on a communication link 12 between the said aircraft and the said ground station, such as the usual communication means installed on board this aircraft (VHF, HF radiocommunication means, satellite communication means, etc.);
- communication management means 14 connected to these emitting/receiving means 10 via a link 30. These communication management means may in particular be part of a calculator that manages aircraft communications, such as a calculator of ATSU type ("Air Traffic Services Unit" in English);
- means (not illustrated) capable of storing in memory an old and a new security level when the aircraft sends to the ground station a request to change the security level of the communication. Preferably, these means are part of communication management means 14;
- means 28 capable of storing in memory a communication state corresponding to an acknowledgment or to an absence of acknowledgment, by the ground station, of a request to change the security level of the communication, sent by the aircraft to the said ground station;
- communication monitoring means 16, which comprise:
  - first means 22 capable of analyzing a message received by emitting/receiving means 10 in order to determine a security level associated with this message;
  - second means 24 capable of comparing this security level corresponding to this received message with the said new security level stored in memory and of furnishing a comparison result;
  - third means 26 capable of determining an action relating to acceptance of the said received message as a function on the one hand of the comparison result furnished by second means 24 and on the other hand of the value of the said communication state stored in memory.

Preferably, communication management means 14 are provided with a router 18 that receives, from emitting/receiving means 10, via link 30, the received messages of communication link 12 and that is capable of sending each message to at least one destination application A1, A2, ... An via a set of links 34. Each of the said applications may in particular be a computerized application installed on a calculator of the aircraft. In reciprocal manner, this router collects messages originating from the said applications via the set of links 34 and transmits them via link 30 to emitting/receiving means 10, which sends them on communication link 12.

Also preferably, as represented in FIG. 1, communication monitoring means 16 are integrated in communication management means 14. They are connected to router 18 by a link 32.

Communication management means 14 additionally comprise means 28 capable of managing the said communication state associated with communication link 12. These means 28 may be integrated in communication monitoring means 16. These means 28 may correspond to a state machine that may in particular be provided with at least two states: a first state corresponding to coherence between the security level demanded by the aircraft and the security level considered to be active by the ground station; a second state corresponding to incoherence between the security level demanded by the aircraft and the security level considered to be active by the ground station. This second state corresponds to a situation in which communication management means 14 of the aircraft have transmitted a request message intended for the ground station in order to change the security level of the communication (for example, following a request from the aircraft pilot) and in which the said communication management means 14 of the aircraft have not received an acknowledgment from the ground station relating to this change of level. Preferably, if the aircraft does not receive any acknowledgment from the ground station after having sent it a request to change the security level of the communication, it resends this request to the ground station after a predetermined duration. In this way the aircraft may send this request at least a predetermined number N of times (for example, 3 times) to the ground station, and the said second state is activated only when an acknowledgment by the ground station has not been received by the aircraft after the aircraft has sent N requests to change the security level. That makes it possible to overcome situations in which the absence of reception of the acknowledgment is due to a brief perturbation of the communication link, such as an electromagnetic perturbation. The first state in turn corresponds in particular to a situation in which communication management means 14 of the aircraft, after having transmitted a request message intended for the ground station in order to change the security level of the communication (for example, following a request from the aircraft pilot), have received an acknowledgment from the ground station relating to this change of level: coherence exists between the security level demanded by the aircraft and the security level considered to be active by the ground station.

When communication management means 14 are part of a calculator of ATSU type, communication monitoring means 16 integrated in the said communication management means 14, as well as first means 22, second means 24, third means 26 and means 28 capable of managing a communication state can be implemented in the form of software functions of the said ATSU calculator.

The security level of the communication may in particular be chosen within the set of following levels or within a subset of this set:
  absence of security of the communication with respect to risks of attack by a pirate;
  authentication of the emitter of a message, for example by using authentication algorithms that use authentication keys;
  encryption of messages transmitted on data link 12, for example by using encryption algorithms that use encryption keys;
  authentication of the emitter of a message and encryption of messages transmitted on data link 12.

In a preferred embodiment of the invention, the communication is capable of being configured according to:
  a first level corresponding to absence of security of the said communication with respect to risks of attack by a pirate;
  a second security level corresponding to authentication of the emitter of a message; or
  a third security level corresponding to authentication of the emitter of a message, as well as to encryption of messages transmitted on data link 12.

When emitting/receiving means 10 receive a message of communication link 12, they transmit it via link 30 to communication management means 14, where this message is received by router 18. The latter transmits it via link 32 to first means 22 integrated in communication monitoring means 16. These first means 22 analyze this message in such a way as to determine the security level corresponding to this message. This security level is transmitted via a link 36 to second means 24. The said second means compare this security level with the said new security level associated with the communication, stored in memory in communication means 14. The result of the comparison between the security level corresponding to the received message and the new security level stored in memory is transmitted by second means 24 via a link 38 to third means 26.

Third means 26 also receive from means 28, via a link 40, the said communication state associated with communication link 12. In the case in which this communication state corresponds to the said first state (coherence between the security level demanded by the aircraft and the security level considered to be active by the ground station), third means 26, in conventional manner, send back to router 18, via link 32, an information item for acceptance of the received message when its security level corresponds to the said new security level, and they send back to the router, via link 32, an information item for rejection of the received message when its security level is different from the said new security level. In the case in which this communication state corresponds to the said second state (incoherence between the security level demanded by the aircraft and the security level considered to be active by the ground station), third means 26, in accordance with the invention, send back to the router, via link 32, an information item for acceptance of the received message when its security level corresponds to the said new security level. This mode of operation is advantageous, because in this case it permits the secure communication to be continued despite the temporary incoherence between the security level demanded by the aircraft and the security level considered to be active by the ground station.

When the router receives, via link 32, an information item for acceptance of the received message, it transmits this message via the set of links 34 to the destination application. When the router receives, via link 32, an information item for rejection of the received message, the router does not transmit this message to the destination application.

Preferably, second means 24 also compare the security level corresponding to the received message with the said old security level stored in memory in communication management means 14. The result of the comparison between the security level corresponding to the received message and the old security level stored in memory is transmitted by second means 24 via link 38 to third means 26. In the case in which the said communication state corresponds to the said second state (incoherence between the security level demanded by the aircraft and the security level considered to be active by the ground station):
  third means 26 send back to the router, via link 32, an information item for acceptance of the received message when its security level corresponds to the said old security level and the new security level corresponds to a security level higher than the old security level. That makes it possible in this case to continue the secure communication despite a temporary incoherence between the security level demanded by the aircraft and the security level considered to be active by the ground station;
  third means 26 send back to the router, via link 32, an information item for rejection of the received message when its security level corresponds to the said old security level and the new security level corresponds to a security level lower than the old security level. In this way, it is guaranteed that the aircraft will not accept a message transmitted by the ground station according to a security level higher than the new security level demanded by the aircraft. That makes it possible to respect the legislation of countries that prohibit high security levels, particularly encryption of communications.

Also preferably, in the case in which the said communication state corresponds to the said second state (incoherence between the security level demanded by the aircraft and the security level considered to be active by the ground station) while a message is being sent by the aircraft to the ground station:

when the new security level corresponds to a security level higher than the old security level, communication management means 14 send a message to the ground station, by way of link 30, emitting/receiving means 10 and communication link 12 according to the old security level. That makes it possible to continue the secure communication by sending a message to the ground station according to the old security level which, for the aircraft, is that considered to be active by the ground station, since the aircraft has not received acknowledgment of its request to change the security level;

when the new security level corresponds to a security level lower than the old security level, communication management means 14 send this message to the ground station, by way of link 30, emitting/receiving means 10 and communication link 12 according to the new security level. In this way, the aircraft does not send a message to the ground station according to a security level higher than the new security level. That makes it possible to respect the legislation of countries that prohibit high security levels, particularly encryption of communications.

Advantageously, in the case in which the said communication state corresponds to the said second state (incoherence between the security level demanded by the aircraft and the security level considered to be active by the ground station):

after receiving a message originating from the ground station, communication management means 14 send a request message to the ground station, by way of link 30, emitting/receiving means 10 and communication link 12, to ask this ground station again to change the security level of the communication in order to bring it to the said new security level; and/or before the sending of a message to the ground station by the aircraft, communication management means 14 send a request message to the ground station, by way of link 30, emitting/receiving means 10 and communication link 12, to ask this ground station again to change the security level of the communication in order to bring it to the said new security level.

That makes it possible, if the circumstances that caused the temporary incoherence between the security level demanded by the aircraft and the security level considered to be active by the ground station have disappeared, to re-establish coherence between these security levels.

According to a first variant of the invention, the security level of the communication is common to all messages circulating on communication link 12 between the aircraft and this ground station.

According to another variant, when the messages circulating on the said communication link are capable of being classified according to different message types, the security level of the communication is a function of the message type. That has the advantage that it makes it possible to adapt the security level to the importance and criticality of the messages. Thus it is possible to send, with a high security level (such as the said third level), only messages for which this is of importance. That makes it possible to reduce the costs of operation of the aircraft when the cost of transmission of a message increases as a function of the security level corresponding to this message. As an example, a first type of message known as ATC ("Air Traffic Control" in English) may correspond to messages exchanged between the aircraft and air traffic control, and a second type of message known as AOC ("Airline Operational Control" in English) may correspond to messages exchanged between the aircraft and the airline company that operates that aircraft.

The invention claimed is:

1. A method for communication according to a plurality of security levels on a communication link between an aircraft and a ground station, the method comprising:
   sending, from the aircraft to the ground station, a request to modify the security level of the communication link from an old security level to a new security level that corresponds to a lower security level than the old security level;
   failing to receive, at the aircraft, any acknowledgment of the request from the ground station;
   storing in memory a communication state indicating the failing to receive any acknowledgement of the request;
   receiving, at the aircraft, a message from the ground station;
   comparing the new security level and a security level of the received message; and
   accepting, at the aircraft, the message received from the ground station if the security level of the received message is equal to the new security level and based on the communication state stored in the memory.

2. The method according to claim 1, wherein, when the aircraft does not receive the acknowledgment and the new security level corresponds to the lower security level than the old security level, the aircraft sends messages to the ground station according to the new security level.

3. The method according to claim 1, wherein, when the aircraft receives from the ground station a message whose security level corresponds to the new security level, the aircraft considers that the request to change the security level of the communication has been acknowledged by the ground station.

4. The method according to claim 1, wherein the security level of the communication is a function of the type of message transmitted.

5. The method according to claim 1, wherein the communication is configured according to:
   a first level corresponding to absence of security of the communication with respect to risks of attack by a pirate;
   a second security level corresponding to authentication of an emitter of a message; or
   a third security level corresponding to authentication of the emitter of a message, as well as to encryption of messages transmitted on a data link.

6. A device installed in an aircraft for communication according to a plurality of security levels on a communication link between the aircraft and a ground station, the device comprising:
   means for emitting/receiving messages on the communication link;
   communication management means connected to the emitting/receiving means;
   communication monitoring means comprising first means for analyzing a message received by the emitting/receiving means to determine a security level corresponding to the message;

means for storing in memory an old security level and a new security level when the aircraft sends to the ground station a request to change the security level of the communication, the new security level corresponds to a lower security level than the old security level;

means for storing in memory a communication state corresponding to an absence of receiving an acknowledgment message from the ground station in response to the request to change the security level of the communication sent by the aircraft to the ground station; and in the communication monitoring means:
- second means for comparing the security level corresponding to the received message with the new security level stored in memory and for furnishing a comparison result indicating that the security level of the received message is the new security level that corresponds to the lower level of security than the old security level; and
- third means for accepting, at the aircraft, the received message if the security level of the received message is equal to the new security level and based on the value of the communication state stored in memory.

7. An aircraft comprising a device according to claim 6.

8. The device according to claim 6, wherein the third means for accepting the received message accepts the received message when the comparison result furnished by the second means for comparing indicates the security level corresponding to the received message is different than the new security level stored in the memory and when the value of the communication state stored in the memory indicates the absence of receiving the acknowledgement message from the ground station in response to the request to change the security level of the communication sent by the aircraft to the ground station.

9. A device installed in an aircraft for communication according to a plurality of security levels on a communication link between the aircraft and a ground station, the device comprising:
- an emitter/receiver configured to emit and receive messages on the communication link;
- a communication management unit connected to the emitter/receiver;
- a communication monitoring unit including an analyzing unit configured to analyze a message received by the emitter/receiver to determine a security level corresponding to the message;
- a storage unit configured to store in memory an old security level and a new security level when the aircraft sends to the ground station a request to change the security level of the communication, and configured to store in the memory a communication state corresponding to an absence of receiving an acknowledgment message from the ground station in response to the request to change the security level of the communication sent by the aircraft to the ground station, the new security level corresponds to a lower security level than the old security level; and the communication monitoring unit further includes
- a security comparison section configured to compare the security level corresponding to the received message with the new security level stored in the memory and to furnish a comparison result indicating that the security level of the received message is the new security level that corresponds to the lower level of security than the old security level, and
- an action determining section configured to accept, at the aircraft, the received message if the security level of the received message is equal to the new security level and based on the value of the communication state stored in the memory.

10. An aircraft comprising the device of claim 9.

11. The device according to claim 9, wherein the action determining section determines to accept the received message when the comparison result furnished by the security comparison section indicates the security level corresponding to the received message is different than the new security level stored in the memory and when the value of the communication state stored in the memory indicates the absence of receiving the acknowledgement message from the ground station in response to the request to change the security level of the communication sent by the aircraft to the ground station.

* * * * *